United States Patent
Lorentz et al.

(10) Patent No.: US 12,458,024 B2
(45) Date of Patent: Nov. 4, 2025

(54) COMPOUND COMBINATION WITH SUPERIOR HERBICIDAL ACTIVITY

(71) Applicant: Bayer Aktiengesellschaft, Leverkusen (DE)

(72) Inventors: Lothar Lorentz, Waldbrol (DE);
Volker Kuhnhold, Cologne (DE);
Martin Wegener, Weilerswist (DE);
Georg Reuter, Hattersheim (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 416 days.

(21) Appl. No.: 17/909,969

(22) PCT Filed: Apr. 7, 2021

(86) PCT No.: PCT/EP2021/059042
§ 371 (c)(1),
(2) Date: Sep. 7, 2022

(87) PCT Pub. No.: WO2021/204862
PCT Pub. Date: Oct. 14, 2021

(65) Prior Publication Data
US 2023/0135960 A1    May 4, 2023

(30) Foreign Application Priority Data

Apr. 9, 2020 (EP) ..................... 20169010
Aug. 11, 2020 (EP) ..................... 20190529

(51) Int. Cl.
*A01N 43/68* (2006.01)
*A01N 37/02* (2006.01)
*A01N 43/70* (2006.01)
*A01P 13/00* (2006.01)

(52) U.S. Cl.
CPC ............. *A01N 43/68* (2013.01); *A01N 37/02* (2013.01); *A01N 43/70* (2013.01); *A01P 13/00* (2021.08)

(58) Field of Classification Search
CPC ........ A01N 43/68; A01N 37/02; A01N 43/70; A01P 13/00
See application file for complete search history.

(56) References Cited

FOREIGN PATENT DOCUMENTS

| | | |
|---|---|---|
| JP | 2003-342104 A | 12/2003 |
| WO | WO 2019/064284 A1 | 4/2019 |
| WO | WO 2020/061706 A1 | 4/2020 |

*Primary Examiner* — Trevor Love
(74) *Attorney, Agent, or Firm* — Michael VanEngelen

(57) ABSTRACT

The present invention relates to an active compound combination comprising (a) a 1,3,5 triazine herbicide and (b) pelargonic acid or a derivative thereof, a composition comprising the active compound combination as well as methods for controlling unwanted plants using said combination.

7 Claims, No Drawings

COMPOUND COMBINATION WITH SUPERIOR HERBICIDAL ACTIVITY

CROSS-REFERENCE TO RELATED APPLICATIONS

The present application is a 35 U.S.C. § 371 national phase entry of International Application No. PCT/EP2021/059042, filed on Apr. 7, 2021, which claims priority to European Patent Application Nos. 20169010.4, and 20190529.6, filed Apr. 9, 2020, and Aug. 11, 2020, respectively, all of which are hereby incorporated by reference in their entirety.

The non-selective herbicidal activity of pelargonic acid has been known in the art. Pelargonic acid or ammonium nonanoate are frequently used straight or in combination with e.g. glyphosate for weed control of emerged weeds. However, increased levels of resistance are observed for certain weeds. Furthermore, the use of glyphosate is currently intensively discussed in public. Accordingly, it is desirable to provide novel combinations including naturally derived herbicides with enhanced activity to overcome these obstacles. With respect to herbicides based on biological control agents, it is desirable to provide combinations to control a broader weed spectrum and increase the durability of weed control while maintaining a high amount of crop safety.

This technical problem has at least in part been solved by the present invention as described in the following.

Accordingly, in one aspect the present invention relates to an active compound combination comprising
(a) a 1,3,5 triazine herbicide
and
(b) pelargonic acid or a derivative thereof.

Triazine herbicides are known in the art to be a very versatile group of herbicides used globally. Members of this group are used to selectively control weeds in broad acre crops such as corn, sorghum and sugarcane, but they are also very important herbicides in horticultural and plantation crops and on non-crop land/right of way. The main weed control activity of this group is used in preemergence of weeds where a significant soil residual activity can be seen, depending on the crop and use where the actives are applied. According to the HRAC classification members of this group belong to HRAC class C1 inhibition of photosynthesis at PSII and to the HRAC class L Inhibition of cellulose synthesis.

Known triazine herbicides include dipropetryn, fucaojing, trihydroxytriazine, chlorotriazine herbicides including atrazine, chlorazine, cyanazine, cyprazine, eglinazine, ipazine, mesoprazine, procyazine, proglinazine, propazine, sebuthylazine, simazine, terbuthylazine and trietazine, fluoroalkyltriazine herbicides including indaziflam and triaziflam, methoxytriazine herbicides including atraton, methometon, prometon, secbumeton, simeton and terbumeton, and methylthiotriazine herbicides such as ametryn, aziprotryne, cyanatryn, desmetryn, dimethametryn, methoprotryne, prometryn, simetryn and terbutryn.

Pelargonic acid, also known as nonanoic acid, is a saturated fatty acid and has the structural formula $CH_3(CH_2)_7CO_2H$. The compound has long been known for its herbicidal activity which also extends to at least some of its derivatives. Herbicidal activity is non-selective and based on a quick burn-down effect in the control of weeds.

Derivatives of pelargonic acid comprise salts and esters thereof which are called nonanoates. Derivatives with known herbicidal activity include ammonium nonanoate.

Further possible derivatives include nonanoic methyl, ethyl-, propyl- and isopropyl esters, as well as sodium and potassium nonanoate.

In a preferred embodiment, the 1,3,5 triazine herbicide has the Formula (I)

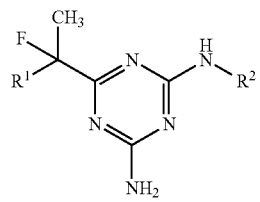

Wherein
R1 is hydrogen or methyl,
R2 is a moiety containing a phenyl group with one or more methyl groups, wherein R2 has a total of 10 to 12 carbon atoms (preferably 11 carbon atoms), and preferably consists of C, H and optionally O.

In a more preferred embodiment, compound a) is selected from the group consisting of indaziflam and triaziflam. Indaziflam has the formula

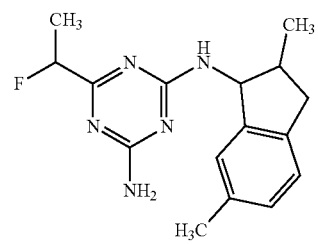 [SMILES: Cc1ccc2c(c1)C(Nc1nc(N)nc(C(C)F)n1)C(C)C2]

Triaziflam has the formula

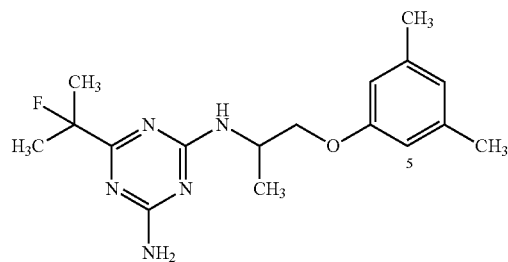 [SMILES: Cc1cc(C)cc(OCC(C)Nc2nc(N)nc(C(C)(C)F)n2)c1]

In another preferred embodiment, compound (a) is terbuthylazine. Terbuthylazine has the formula

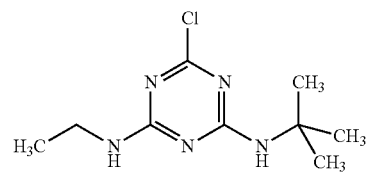

It is most preferred that compound (a) is indaziflam. Preferred in the context of the present invention is the (1R)-1-fluoroethyl diastereoisomer of indaziflam represented by the following structure (the (1R)-1-fluoroethyl moiety is marked with an asterisk 1*R):

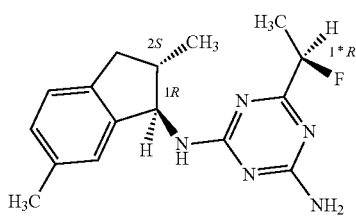

Indaziflam (IUPAC-Name: N2-[(1R,2S)-2,3-dihydro-2,6-dimethyl-1H-inden-1-yl]-6-[(1RS)-1-fluoroethyl]-1,3,5-triazine-2,4-diamine, CAS Reg. No. 950782-86-2, its (1R)-1-fluoroethyl diastereoisomer, CAS Reg. No. 730979-19-8, and its (1S)-1-fluoroethyl diastereoisomer CAS Reg. No. 730979-32-5) are known and described for example in U.S. Pat. No. 6,069,114 A, EP 0 864 567 A1 and EP 1 592 674 A1.

In another more preferred embodiment, compound (a) is terbuthylazine.

In the course of the present invention it has surprisingly been found that compounds (a) and (b) according to the active compound combination according to the present invention exert superior effects in controlling weeds. As can be seen from the examples, the active compound combination in addition to its already superior control of weeds in many cases exerts a synergistic effect when applied to different kinds of weeds.

Without wishing to be bound to any scientific theory, the present inventors believe that the observed effect may be attributed to the different mode of action of both compounds of the active compound combination. Whereas compound (a) is known to act as strong residual compound inhibiting the emergence of weeds, compound (b) (HRAC: Z Unknown Mode of action) acts immediately and the first effects can be seen already after few hours following the application.

The active compound combinations according to the present invention and the compositions comprising said active compound combinations allow excellent (total) weed control at an agronomically acceptable level of crop damage. Herbicidal action starts rapidly and is long-lasting. In particular when the active compound combination or the composition according to the invention is applied prior to planting (e.g. burn-down application) or emergence of the crop (e.g. pre-emergence (PRE) application), damage can be minimized. However, the active compound combination or the composition does not only enable for the treatment of areas where crops are or are to be cultivated but also enables for weed control in other areas. This is particularly useful for keeping train tracks and public areas where vegetation is unwanted free of such vegetation or providing weed control in plantations and orchards within the entire area or within the tree rows. Furthermore, applications of the combination or composition according to the invention with a physical barrier between spray and crop, or a directed application solely on weed plants selectively inbetween crop plants, allows for selective use with a superior weed control in a broad range of row crops, vegetables and ornamentals. The actual active compound combination or the composition of the invention can also be used to increase desiccation of leafy row crops like potatoes, cereals, soybeans, sunflower.

Another particular advantage of the active compound combination or the composition according to the invention is that the effective doses of compounds (a) and (b) used in the combination or the composition can be set so low that their soil activity/residual activity is optimally low. This means that use of the combination or the composition according to the invention is also possible in sensitive crops and minimizes the risk for phytotoxicity for the following crop. The combination of active compounds according to the invention enables a considerable reduction in the amount of active substances required.

In one preferred embodiment, the active compound composition further comprises as compound (c) a further herbicidally active compound.

In the active compound combination or composition comprising an active compound combination according to the invention the ratio by weight of the total amount of compound (a) to the total amount of compound (b) is usually in the range of between 1:5000 and 1:1, such as between 1:4000 and 1:5 or 1:3000 and 1:10, preferably in the range of between 1:2500 and 1:50, particularly preferably in the range of between 1:1600 and 1:120. Whereas the above ratios already show superior action, at ratios starting with about 1:1600, going via 1:600 and 1:320 up to 1:120 (see examples relating to indaziflam and triaziflam), also synergistic action against particular weeds can be observed. In some cases, also ratios starting with 1:8 may result in a synergistic effect. For terbuthylazine, preferred ratio ranges lie between 1:1 and 1:250, preferably between 1:5 and 1:150, more preferably between 1:8 and 1:128.

The preferred application rates [indicated as g a.i./ha, i.e. grams of active ingredient per hectare] of the active compounds according to the present invention as defined herein are as follows:

Compound (a) is preferably applied at a rate in the range of 5 to 1500 g a.i./ha, more preferably between 10 and 1000 g a.i./ha, particularly preferably at a rate in the range of 15 and 750 g a.i./ha.

If compound (a) is indaziflam or triaziflam, the application rate is preferably in the range of 5 to 100 a.i./ha, more preferably between 7.5 and 75 g a.i./ha, particularly preferably between 10 and 50 g a.i./ha.

If compound (a) is terbuthylazine, the application rate is preferably in the range of 50 to 1500 a.i./ha, more preferably between 100 and 750 g a.i./ha, particularly preferably between 120 and 500 g a.i./ha.

Pelargonic acid is preferably applied at a rate in the range of 2000 to 40000 g a.i./ha, more preferably at a rate in the range of 4000 to 20000 g a.i./ha, particularly preferably at a rate in the range of 6000 to 16000 g a.i./ha.

As can be seen in the appended examples, application ratios of between about 1:1600 and 1:120 show superior action against a broad spectrum of weeds at different application rates of both compounds (a) and (b). Synergistic action is also observed within ratio ranges of terbuthylazine and pelargonic acid of between 1:1 and 1:130.

The present invention also relates to synergistic active compound combinations comprising compounds (a) and (b) as defined herein.

The appended examples show that already at ratios of compounds (a) and (b) of around 1:120, and for terbutylazine even at 1:128, synergistic action is observed against various weeds such as *Chenopodium album, Setaria viridis, Echinoloa crus-galli, Panicum maximum* and *Zea mays* at 13 and 14 days after application of the active compound combination.

In another aspect, the present invention relates to a composition comprising the active compound combination according to the invention and at least one auxiliary.

As already mentioned above, the active compound combinations according to the present invention can not only be used as mixed formulations, if appropriate together with further agrochemically active compounds, additives and/or customary formulation auxiliaries, which are then applied in the customary manner as a dilution with water, but also as so-called tank mixes by jointly diluting the separately formulated, or partially separately formulated, components with water.

If not mentioned otherwise, the expression "combination" stands for the various combinations of compounds (a) and (b), in a solo-formulation, in a single "ready-mix" form, in a combined spray mixture composed from solo-formulations, such as a "tank-mix", and especially in a combined use of the single active ingredients when applied in a sequential manner, i.e. one after the other within a reasonably short period, such as a few minutes or hours or days, e.g. 2 hours to 7 days. The order of applying the composition according to the present invention is not essential for working the present invention. Accordingly, the term "combination" also encompasses the presence of compounds (a) and (b) on or in a plant to be treated or its surrounding, habitat including a lucus where a plant or crop is intended to be grown, e.g. after simultaneously or consecutively applying compounds (a) and (b) to a plant its surrounding, habitat or storage space.

If compounds (a) and (b) are employed or used in a sequential manner, it is preferred to treat the plants or plant parts (which includes seeds and plants emerging from the seed): Firstly applying compound (a) or compound (b) on the plant or plant parts, and secondly applying compound (b) or compound (a) to the same plant or plant parts. The time periods between the first and the second application within a (crop) growing cycle may vary and depend on the effect to be achieved. For example, the first application is done as a broadcast application across the entire planting area including corn plants within the crop row and the interrow space to combat existing and emerging weed plants and the second application is treating only the interrow space in between the corn rows preventing spray drift onto corn plants. Control in this context means that the respective compound or active compound combination is able to keep weed growth on an acceptable level or completely inhibits it or destroys existing weeds.

For example, the active compound combination as defined herein may additionally comprise one or more further agrochemically active compounds (i.e. agrochemically active compounds different from components (a) and (b) as defined above).

Agrochemically active compounds which can be used in combination with the active compound combination according to the invention in mixed formulations or in tank mix are, for example, known active compounds as they are described in, for example, Weed Research 26, 441-445 (1986), or "The Pesticide Manual", 15th edition, The British Crop Protection Council and the Royal Soc. of Chemistry, 2006, and the literature cited therein, and which for example act as inhibitor of acetolactate synthase, acetyl-CoA-carboxylase, cellulose-synthase, enolpyruvylshikimat-3-phosphat-synthase, glutamin-synthetase, p-hydroxyphenylpyruvat-dioxygenase, phytoendesaturase, photosystem I, photosystem II, and/or protoporphyrinogen-oxidase.

Examples of active compounds which may be mentioned as herbicides or plant growth regulators which are known from the literature and which can be combined with the active compound combination according to the invention are the following (compounds are either described by "common name" in accordance with the International Organization for Standardization (ISO) or by chemical name or by a customary code number), and always comprise all applicable forms such as acids, salts, ester, or modifications such as isomers, like stereoisomers and optical isomers. As an example, at least one applicable form and/or modifications can be mentioned.

Examples for herbicides are:

Acetochlor, acifluorfen, acifluorfen-sodium, aclonifen, alachlor, allidochlor, alloxydim, alloxydim-sodium, ametryn, amicarbazone, amidochlor, amidosulfuron, 4-amino-3-chloro-5-fluoro-6-(7-fluoro-1H-indol-6-yl)pyridine-2-carboxylic acid, aminocyclopyrachlor, aminocyclopyrachlor-potassium, aminocyclopyrachlor-methyl, aminopyralid, amitrole, ammoniumsulfamate, anilofos, asulam, atrazine, azafenidin, azimsulfuron, beflubutamid, benazolin, benazolin-ethyl, benfluralin, benfuresate, bensulfuron, bensulfuron-methyl, bensulide, bentazone, benzobicyclon, benzofenap, bicyclopyron, bifenox, bilanafos, bilanafos-sodium, bispyribac, bispyribac-sodium, bixlozone, bromacil, bromobutide, bromofenoxim, bromoxynil, bromoxynil-butyrate, -potassium, -heptanoate, and -octanoate, busoxinone, butachlor, butafenacil, butamifos, butenachlor, butralin, butroxydim, butylate, cafenstrole, carbetamide, carfentrazone, carfentrazone-ethyl, chloramben, chlorbromuron, 1-{2-chloro-3-[(3-cyclopropyl-5-hydroxy-1-methyl-1H-pyrazol-4-yl)carbonyl]-6-(trifluormethyl)phenyl}piperidin-2-on, 4-{2-chloro-3-[(3,5-dimethyl-1H-pyrazol-1-yl) methyl]-4-(methylsulfonyl)benzoyl}-1,3-dimethyl-1H-pyrazol-5-yl-1,3-dimethyl-1H-pyrazol-4-carboxylat, chlorfenac, chlorfenac-sodium, chlorfenprop, chlorflurenol, chlorflurenol-methyl, chloridazon, chlorimuron, chlorimuron-ethyl, 2-[2-chloro-4-(methylsulfonyl)-3-(morpholin-4-ylmethyl)benzoyl]-3-hydroxycyclohex-2-en-1-on, 4-{2-chloro-4-(methylsulfonyl)-3-[(2,2,2-trifluorethoxy) methyl]benzoyl}-1-ethyl-1H-pyrazol-5-yl-1,3-dimethyl-1H-pyrazol-4-carboxylat, chlorophthalim, chlorotoluron, chlorthal-dimethyl, 3-[5-chloro-4-(trifluormethyl)pyridine-2-yl]-4-hydroxy-1-methylimidazolidine-2-on, chlorsulfuron, cinidon, cinidon-ethyl, cinmethylin, cinosulfuron, clacyfos, clethodim, clodinafop, clodinafop-propargyl, clomazone, clomeprop, clopyralid, cloransulam, cloransulam-methyl, cumyluron, cyanamide, cyanazine, cycloate, cyclopyranil, cyclopyrimorate, cyclosulfamuron, cycloxydim, cyhalofop, cyhalofop-butyl, cyprazine, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, 2,4-DB, 2,4-DB-butyl, -dimethylammonium, -isooctyl, -potassium, and -sodium, daimuron (dymron), dalapon, dazomet, n-decanol, desmedipham, detosyl-pyrazolate (DTP), dicamba, dichlobenil, dichlorprop, dichlorprop-P, diclofop, diclofop-methyl, diclofop-P-methyl, diclosulam, difenzoquat, diflufenican, diflufenzopyr, diflufenzopyr-sodium, dimefuron, dimepiperate, dimethachlor, dimethametryn, dimethenamid, dimethenamid-P, 3-(2,6-dimethylphenyl)-6-[(2-hydroxy-6-oxocyclohex-1-en-1-yl)carbonyl]-1-methylchinazolin-2,4(1H,3H)-dion, 1,3-dimethyl-4-[2-(methylsulfonyl)-4-(trifluormethyl)benzoyl]-1H-pyrazol-5-yl-1,3-dimethyl-1H-pyrazol-4-carboxylat, dimetrasulfuron, dinitramine, dinoterb, diphenamid, diquat, diquat-dibromid, dithiopyr, diuron, DMPA, DNOC, endothal, EPTC, esprocarb, ethalfluralin, ethametsulfuron, etha-metsulfuron-methyl, ethiozin, ethofumesate, ethoxyfen, ethoxyfen-ethyl, ethoxysulfuron, etobenzanid, ethyl-[(3-{2-chloro-4-fluoro-5-[3-methyl-2,6-dioxo-4-(trifluormethyl)-3,6-dihydropyrimidin-1(2H)-yl]phenoxy}pyridin-2-yl)oxy]acetat, F-9960, F-5231, i.e. N-{2-chloro-4-fluoro-5-[4-(3-fluoropropyl)-5-oxo-4,5-dihydro-1H-tetrazol-1-yl]phenyl}ethanesulfonamide, F-7967, i. e. 3-[7-chloro-5- fluoro-2-(trifluoromethyl)-1H-benzimidazol-4-yl]-1-methyl-6-(trifluoromethyl)pyrimidine-2,4(1H,3H)-dione, fenoxaprop, fenoxaprop-P, fenoxaprop-ethyl, fenoxaprop-P-ethyl, fenoxasulfone, fenquinotrione, fentrazamide, flamprop, flamprop-M-isopropyl, flamprop-M-methyl, flazasulfuron, florasulam, fluazifop, fluazifop-P, fluazifop-butyl, fluazifop-P-butyl, flucarbazone, flucarbazone-sodium, flucetosulfuron, fluchloralin, flufenacet, flufenpyr, flufenpyr-ethyl, flumetsulam, flumiclorac, flumiclorac-pentyl, flumioxazin, fluometuron, flurenol, flurenol-butyl, -dimethylammonium and -methyl, fluoroglycofen, fluoroglycofen-ethyl, flupropanate, flupyrsulfuron, flupyrsulfuron-methyl-sodium, fluridone, flurochloridone, fluroxypyr, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P-sodium, glufosinate-P-ammonium, glufosinate-P-sodium, glyphosate, glyphosate-ammonium, -isopropyl-ammonium, -diammonium, -dimethylammonium, -potassium, -sodium, and -trimesium, H-9201, i.e. O-(2,4-dimethyl-6-nitrophenyl)O-ethyl isopropylphosphoramidothioate, halauxifen, halauxifen-methyl, halosafen, halosulfuron, halosulfuron-methyl, haloxyfop, haloxyfop-P, haloxyfop-ethoxyethyl, haloxyfop-P-ethoxyethyl, haloxyfop-methyl, haloxyfop-P-methyl, hexazinone, HW-02, i.e. 1-(dimethoxyphosphoryl) ethyl-(2,4-dichlorophenoxy)acetate, 4-hydroxy-1-methoxy-5-methyl-3-[4-(trifluormethyl)pyridine-2-yl]imidazolidine-2-on, 4-hydroxy-1-methyl-3-[4-(trifluormethyl)pyridine-2-yl]imidazolidine-2-on, (5-hydroxy-1-methyl-1H-pyrazol-4-yl)(3,3,4-trimethyl-1,1-dioxido-2,3-dihydro-1-benzothiophen-5-yl)methanon, 6-[(2-hydroxy-6-oxocyclohex-1-en-1-yl)carbonyl]-1,5-dimethyl-3-(2-methylphenyl)chinazolin-2,4(1H,3H)-dion, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-immonium, imazosulfuron, indanofan, iodosulfuron, iodosulfuron-methyl-sodium, ioxynil, ioxynil-octanoate, -potassium and -sodium, ipfencarbazone, isoproturon, isouron, isoxaben, isoxaflutole, karbutilate, KUH-043, i.e. 3-({[5-(difluoromethyl)-1-methyl-3-(trifluoromethyl)-1H-pyrazol-4-yl] methyl}sulfonyl)-5,5-dimethyl-4,5-dihydro-1,2-oxazole, ketospiradox, lactofen, lenacil, linuron, MCPA, MCPA-butotyl, -dimethylammonium, -2-ethylhexyl, -isopropylammonium, -potassium, and -sodium, MCPB, MCPB-methyl, -ethyl, and -sodium, mecoprop, mecoprop-sodium, and -butotyl, mecoprop-P, mecoprop-P-butotyl, -dimethylammonium, -2-ethylhexyl, and -potassium, mefenacet, mefluidide, mesosulfuron, mesosulfuron-methyl, mesotrione, methabenzthiazuron, metam, metamifop, metamitron, metazachlor, metazosulfuron, methabenzthiazuron, methiopyrsulfuron, methiozolin, 2-({2-[(2-methoxyethoxy)methyl]-6-(trifluormethyl)pyridin-3-yl}carbonyl)cyclohexan-1,3-dion, methyl isothiocyanate, 1-methyl-4-[(3,3,4-trimethyl-1,1-dioxido-2,3-dihydro-1-benzothiophen-5-yl)carbonyl]-1H-pyrazol-5-ylpropan-1-sulfonat, metobromuron, metolachlor, S-metolachlor, metosulam, metoxuron, metribuzin, metsulfuron, metsulfuron-methyl, molinat, monolinuron, monosulfuron, monosulfuron-ester, MT-5950, i.e. N-(3-chloro-4-isopropylphenyl)-2-methylpentan amide, NGGC-011, napropamide, NC-310, i.e. [5-(benzyloxy)-1-methyl-1H-pyrazol-4-yl](2,4-dichlorophenyl)methanone, neburon, nicosulfuron, nonanoic acid (pelargonic acid), norflurazon, oleic acid (fatty acids), orbencarb, orthosulfamuron, oryzalin, oxadiargyl, oxadiazon, oxasulfuron, oxaziclomefon, oxyfluorfen, paraquat, paraquat dichloride, pebulate, pendimethalin, penoxsulam, pentachlorphenol, pentoxazone, pethoxamid, petroleum oils, phenmedipham, picloram, picolinafen, pinoxaden, piperophos, pretilachlor, primisulfuron, primisulfuron-methyl, prodiamine, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen, pyraflufen-ethyl, pyrasulfotole, pyrazolynate (pyrazolate), pyrazosulfuron, pyrazosulfuron-ethyl, pyrazoxyfen, pyribambenz, pyribambenz-isopropyl, pyribambenz-propyl, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quinoclamine, quizalofop, quizalofop-ethyl, quizalofop-P, quizalofop-P-ethyl, quizalofop-P-tefuryl, QYM-201, QYR-301, rimsulfuron, saflufenacil, sethoxydim, siduron, simazine, simetryn, SL-261, sulcotrion, sulfentrazone, sulfometuron, sulfometuron-methyl, sulfosulfuron, SYN-523, SYP-249, i.e. 1-ethoxy-3-methyl-1-oxobut-3-en-2-yl 5-[2-chloro-4-(trifluoromethyl)phenoxy]-2-nitrobenzoate, SYP-300, i.e. 1-[7-fluoro-3-oxo-4-(prop-2-yn-1-yl)-3,4-dihydro-2H-1,4-benzoxazin-6-yl]-3-propyl-2-thioxoimidazolidine-4,5-dione, 2,3,6-TBA, TCA (trichloroacetic acid), TCA-sodium, tebuthiuron, tefuryltrione, tembotrione, tepraloxydim, terbacil, terbucarb, terbumeton, terbutryn, tetflupyrolimet, thenylchlor, thiazopyr, thiencarbazone, thiencarbazone-methyl, thifensulfuron, thifensulfuron-methyl, thiobencarb, tiafenacil, tolpyralate, topramezone, tralkoxydim, triafamone, tri-allate, triasulfuron, tribenuron, tribenuron-methyl, triclopyr, trietazine, trifloxysulfuron, trifloxysulfuron-sodium, trifludimoxazin, trifluralin, triflusulfuron, triflusulfuron-methyl, tritosulfuron, urea sulfate, vernolate, ZJ-0862, i.e. 3,4-dichloro-N-{2-[(4,6-dimethoxypyrimidin-2-yl)oxy]benzyl}aniline.

Examples for plant growth regulators are:

Acibenzolar, acibenzolar-S-methyl, 5-aminolevulinic acid, ancymidol, 6-benzylaminopurine, Brassinolid, catechine, chlormequat chloride, cloprop, cyclanilide, 3-(cycloprop-1-enyl) propionic acid, daminozide, dazomet, n-decanol, dikegulac, dikegulac-sodium, endothal, endothal-dipotassium, -disodium, and -mono(N,N-dimethylalkylammonium), ethephon, flumetralin, flurenol, flurenol-butyl, flurprimidol, forchlorfenuron, gibberellic acid, inabenfide, indol-3-acetic acid (IAA), 4-indol-3-ylbutyric acid, isoprothiolane, probenazole, jasmonic acid, maleic hydrazide, mepiquat chloride, 1-methylcyclopropene, methyl jasmonate, 2-(1-naphthyl)acetamide, 1-naphthylacetic acid, 2-naphthyloxyacetic acid, nitrophenolate-mixture, paclobutrazol, N-(2-phenylethyl)-beta-alanine, N-phenylphthalamic acid, prohexadione, prohexadione-calcium, prohydrojasmone, salicylic acid, strigolactone, tecnazene, thidiazuron, triacontanol, trinexapac, trinexapac-ethyl, tsitodef, uniconazole, uniconazole-P.

In one embodiment, when a combination of herbicides used in the context of the present invention consists of compounds (a) indaziflam, triaziflam or terbuthylazine and (b), this means that in such a case the combination of herbicides according to the present invention or the composition comprising said combination of herbicides according to the present invention does not contain any further (i.e. no additional) herbicidally active ingredient, and preferably does not contain any further agrochemically active compound.

The active compound combinations according to the present invention and the compositions comprising an active compound combination according to the present invention can be formulated in various ways, depending on the prevailing biological and/or chemical-physical parameters. The following are examples of general possibilities for formulations: wettable powders (WP), water-soluble concentrates, emulsifiable concentrates (EC), aqueous solutions (SL), emulsions (EW) such as oil-in-water and water-in-oil emulsions, sprayable solutions or emulsions, suspension concentrates (SC), oil dispersions (OD), oil- or water-based dispersions, suspoemulsions, dusts (DP), seed-dressing materials, granules for soil application or for broadcasting, or water-dispersible granules (WG), ULV formulations, microcapsules or waxes.

The individual formulation types are known in principle and are described for example, in: Winnacker-Küchler, "Chemische Technologie", Volume 7, C. Hauser Verlag Munich, 4th Edition, 1986; van Valkenburg, "Pesticide Formulations", Marcel Dekker N.Y., 1973; K. Martens, "Spray Drying Handbook", 3rd Ed. 1979, G. Goodwin Ltd. London.

The formulation auxiliaries required, such as inert materials, surfactants, solvents and other additives are also known and are described, for example, in Watkins, "Handbook of Insecticide Dust Diluents and Carriers", 2nd Ed., Darland Books, Caldwell N.J.; H. v. Olphen, "Introduction to Clay Colloid Chemistry"; 2nd Ed., J. Wiley & Sons, N.Y. Marsden, "Solvents Guide", 2nd Ed., Interscience, N.Y. 1950; McCutcheon's, "Detergents and Emulsifiers Annual", MC Publ. Corp., Ridgewood N.J.; Sisley and Wood, "Encyclopedia of Surface Active Agents", Chem. Publ. Co. Inc., N.Y. 1964; Schöunfeldt, "Grenzflachenaktive Äthylenoxidaddukte" [Surface-active ethylene oxide adducts], Wiss. Verlagsgesellschaft, Stuttgart 1976, Winnacker-Küchler, "Chemische Technologie", Volume 7, C. Hauser Verlag Munich, 4th Edition 1986.

Based on these formulations, combinations with other agrochemically active substances, such as other herbicides not belonging to the same class as compound (a) as defined in the context of the present invention, fungicides or insecticides, and with safeners, fertilizers and/or growth regulators, may also be prepared, for example in the form of a readymix or a tank mix.

Wettable powders (sprayable powders) are products which are uniformly dispersible in water and which, besides the active compound, also comprise ionic or nonionic surfactants (wetters, dispersants), for example polyoxethylated alkylphenols, polyethoxylated fatty alcohols or fatty amines, alkanesulfonates or alkylbenzenesulfonates, sodium lignosulfonate, sodium 2,2'-dinaphthylmethane-6,6'-disulfonate, sodium dibutylnaphthalenesulfonate or else sodium oleoylmethyltauride, in addition to a diluent or inert material.

Emulsifiable concentrates are prepared by dissolving the active compound in an organic solvent, for example butanol, cyclohexanone, dimethylformamide, xylene or else higher-boiling aromatics or hydrocarbons with addition of one or more ionic or nonionic surfactants (emulsifiers). Examples of emulsifiers which may be used are: calcium salts of alkylarylsulfonic acids, such as calcium dodecylbenzene sulfonate, or nonionic emulsifiers such as fatty acid polyglycol esters, alkylaryl polyglycol ethers, fatty alcohol polyglycol ethers, propylene oxide/ethylene oxide condensates, alkyl polyethers, sorbitan fatty acid esters, polyoxyethylene sorbitan fatty acid esters or polyoxethylene sorbitol esters.

Dusts are obtained by grinding the active compound with finely divided solid materials, for example talc, natural clays such as kaolin, bentonite and pyrophyllite, or diatomaceous earth.

Suspension concentrates (SC) can be water- or oil-based. They can be prepared, for example, by wet grinding by means of commercially available bead mills and, if appropriate, addition of further surfactants as they have already been mentioned for example above in the case of the other formulation types.

Emulsions, for example oil-in-water emulsions (EW), can be prepared for example by means of stirrers, colloid mills and/or static mixers using aqueous organic solvents and, if appropriate, further surfactants as have already been mentioned for example above in the case of the other formulation types.

Granules can be prepared either by spraying the active compound onto adsorptive, granulated inert material or by applying active compound concentrates to the surface of carriers such as sand, kaolinites or granulated inert material with the aid of binders, for example polyvinyl alcohol, sodium polyacrylate or else mineral oils. Suitable active compounds may also be granulated in the manner conventionally used for the production of fertilizer granules, if desired in a mixture with fertilizers. As a rule, water-dispersible granules are prepared by customary processes such as spray drying, fluidized-bed granulation, disk granulation, mixing with high-speed mixers and extrusion without solid inert material. Regarding the production of disk granules, fluidized-bed granules, extruder granules and spray granules, see, for example, the methods in "Spray-Drying Handbook" 3rd ed. 1979, G. Goodwin Ltd., London; J. E. Browning, "Agglomeration", Chemical and Engineering 1967, page 147 et seq; "Perry's Chemical Engineer's Handbook", 5th Ed., McGraw-Hill, New York 1973, pp. 8-57.

As regards further details on the formulation of crop protection products, see, for example, G. C. Klingmam, "Weed Control as a Science", John Wiley and Sons, Inc., New York, 1961, pages 81-96 and J. D. Freyer, S. A. Evans, "Weed Control Handbook", 5th Ed., Blackwell Scientific Publications, Oxford, 1968, pages 101-103.

As a rule, the agrochemical formulations comprise 1 to 95% by weight, of active compounds, the following concentrations being customary, depending on the type of formulation:

The active compound concentration in wettable powders is, for example, approximately 10 to 95% by weight, the remainder to 100% by weight being composed of customary formulation constituents. In the case of emulsifiable concentrates, the active compound concentration may amount to, for example, 5 to 80% by weight. Formulations in the form of dusts comprise, in most cases, 5 to 20% by weight of active compound, sprayable solutions approximately 0.2 to 25% by weight of active compound. In the case of granules such as dispersible granules, the active compound content depends partly on whether the active compound is present in liquid or solid form and on which granulation auxiliaries and fillers are being used. As a rule, the content amounts to between 10 and 90% by weight in the case of the water-dispersible granules.

In addition, the above-mentioned active compound formulations may comprise, if appropriate, the conventional adhesives, wetters, dispersants, emulsifiers, preservatives, antifreeze agents, solvents, fillers, colorants, carriers, antifoams, evaporation inhibitors, pH regulators or viscosity regulators.

The herbicidal action of the herbicide combinations according to the present invention can be improved, for example, by surfactants, preferably by wetters from the group of the fatty alcohol polyglycol ethers. The fatty alcohol polyglycol ethers preferable contain 10-18 carbon atoms in the fatty alcohol radical and 2-20 ethylene oxide units in the polyglycol ether moiety. The fatty alcohol polyglycol ethers can be nonionic or ionic, for example in the form of fatty alcohol polyglycol ethers sulfates, which can be used, for example, as alkali metal salts (e.g. sodium salts or potassium salts) or ammonium salts, but also as alkaline earth metal salts such as magnesium salts, such as sodium C12/C14-fatty alcohol diglycol ether sulfate (Genapol® LRO, Clariant); see, for example, EP-A-0476555, EP-A-0048436, EP-A-0336151 or U.S. Pat. No. 4,400,196 and also Proc. EWRS Symp. "Factors Affecting Herbicidal Activity and Selectivity", 227-232 (1988). Nonionic fatty alcohol polyglycol ethers are, for example, (C10-C18)-, preferably (C10-C14)-fatty alkohol polyglycol ethers containing 2-20, preferably 3-15, ethylene oxide units (e.g. isotridecyl alcohol polyglycol ether), for example from the Genapol® series, such as Genapol® X-030, Genapol® X-060, Genapol® X-080 or Genapol® X-150 (all from Clariant GmbH).

The present invention furthermore embraces the active compound combination comprising compounds (a) and (b) as defined above as active ingredients with the wetting agents mentioned above from the group of the fatty alcohol polyglycolethers which preferably contain 10-18 carbon atoms in the fatty alcohol radical and 2-20 ethylene oxide units in the polyglycol ether moiety and which can be present in nonionic or ionic form (for example as fatty alcohol polyglycol ether sulfates). Preference is given to C12/C14-fatty alcohol diglycol ether sulfate sodium (Genapol® LRO, Clariant); and isotridecyl alcohol polyglycol ether with 3-15 ethylene oxide units, for example from the Genapol® X series, such as Genapol® X-030, Genapol® X-060, Genapol® X-080 or Genapol® X-150 (all from Clariant GmbH). It is furthermore known that fatty alcohol polyglycol ethers such as nonionic or ionic fatty alcohol polyglycol ethers (for example fatty alcohol polyglycol ether sulfates) are also suitable for use as penetrants and activity enhancers for a number of other herbicides, inter alia also for herbicides from the group of the imidazolinones (see, for example, EP-A-0502014).

Moreover, it is known that fatty alcohol polyglycol ethers such as nonionic or ionic fatty alcohol polyglycol ethers (for example fatty alcohol polyglycol ether sulfates) are also suitable as penetrants and synergists for a number of other herbicides, inter alia also herbicides from the group of the imidazolinones; (see, for example, EP-A-0502014).

The herbicidal effect of the herbicide combinations according to the present invention can also be increased using vegetable oils. The term vegetable oils is to be understood as meaning oils from oil-plant species, such as soya oil, rapeseed oil, corn oil, sunflower oil, cottonseed oil, linseed oil, coconut oil, palm oil, safflower oil or castor oil, in particular rapeseed oil, and their transesterification products, for example alkyl esters, such as rapeseed oil methyl ester or rapeseed oil ethyl ester.

The vegetable oils are preferably esters of C10-C22-, preferably C12-C20-fatty acids. The C10-C22-fatty acid esters are, for example, esters of unsaturated or saturated C10-C22-fatty acids, in particular those with an even number of carbon atoms, for example erucic acid, lauric acid, palmitic acid and, in particular, C18-fatty acids such as stearic acid, oleic acid, linoleic acid or linolenic acid.

Preferred C1-C20-alkyl-C10-C22-fatty acid esters are the methyl, ethyl, propyl, butyl, 2-ethylhexyl and dodecyl esters. Preferred glycol- and glycerol-C10-C22-fatty acid esters are the uniform or mixed glycol esters and glycerol esters of C10-C22-fatty acids, in particular those fatty acids which have an even number of carbon atoms, for example erucic acid, lauric acid, palmitic acid and, in particular, C18-fatty acids such as stearic acid, oleic acid, linolic acid or linolenic acid.

The vegetable oils can be present in the herbicidal compositions according to the present invention for example in the form of commercially available oil-containing formulation additives, in particular those based on rapeseed oil such as Hasten® (Victorian Chemical Company, Australia, hereinbelow termed Hasten, main constituent: rapeseed oil ethyl ester), Actirob® B (Novance, France, hereinbelow termed ActirobB, main constituent: rapeseed oil methyl ester), Rako-Binol® (Bayer AG, Germany, termed Rako-Binol hereinbelow, main constituent: rapeseed oil), Renol® (Stefes, Germany, termed Renol hereinbelow, vegetable oil constituent: rapeseed oil methyl ester), or Stefes Mero® (Stefes, Germany, hereinbelow termed Mero, main constituent: rapeseed oil methyl ester).

In a further embodiment, the present invention embraces the combination of a herbicide combination as defined in the context of the present invention with the vegetable oils mentioned above. Thus, in a further embodiment, the present invention embraces the use of compositions comprising a herbicide combination as defined in the context of the present invention comprising the vegetable oils mentioned above, such as rapeseed oil, preferably in the form of commercially available oil-containing formulation additives, in particular those based on rapeseed oil such as Hasten® (Victorian Chemical Company, Australia, hereinbelow termed Hasten, main constituent: rapeseed oil ethyl ester), Actirob® B (Novance, France, hereinbelow termed ActirobB, main constituent: rapeseed oil methyl ester), Rako-Binol® (Bayer AG, Germany, termed Rako-Binol hereinbelow, main constituent: rapeseed oil), Renol® (Stefes, Germany, termed Renol hereinbelow, vegetable oil constituent: rapeseed oil methyl ester), or Stefes Mero® (Stefes, Germany, hereinbelow termed Mero, main constituent: rapeseed oil methyl ester).

For use, the formulations, which are present in commercially available form, are optionally diluted in the customary manner, for example using water in the case of wettable powders, emulsifiable concentrates, dispersions and water-dispersible granules. Preparations in the form of dusts, soil granules, granules for broadcasting and sprayable solutions are usually not diluted further with other inert substances prior to use.

The active compounds can be applied to the plants, parts of the plants, seeds of the plants or the area under cultivation (soil of a field), preferably to the green plants and parts of the plants and, if appropriate, additionally to the soil of the field.

The invention furthermore relates to a method for controlling unwanted plants, characterized in that an active compound combination according to the invention or a composition according to the invention is allowed to act or applied on the unwanted plants and/or their habitat.

In the context of the present invention "controlling" denotes a significant reduction of the growth of the unwanted plant(s) in comparison to the untreated unwanted plants. Preferably, the growth of the unwanted plant(s) is essentially diminished (60-79%), more preferably the growth of the unwanted plant(s) is largely or fully suppressed (80-100%), and in particular the growth of the unwanted plant(s) is almost fully or fully suppressed (90-100%).

Harmful plants include the group of weed species consisting of *Ageratum* spp., *Calopogonium* spp., *Altemanthera* spp., *Boreiria* spp., *Commelina* spp., *Chromolaena* spp., *Mimosa* spp., *Tridax* spp., *Brachiaria* spp., *Platostoma* spp., *Digitaria* spp., *Synedrella* spp., *Panicum* spp., *Cyperus* spp., *Imperata* spp., *Cynodon* spp., *Pennisetum* spp., *Mariscus* spp., *Euphorbia* spp., *Talinum* spp., *Pteridium* spp., *Melinis* spp., *Sida* spp., *Portulaca* spp., *Rottboellia* spp., *Sorghum* spp., *Ipomea* spp., *Dactyloctenium* spp., *Spigelia* spp., *Boerhaavia* spp., *Aspilia* spp., *Aneilima* spp., *Hyparrhenia* spp., *Andropogon* spp., *Paspalum* spp., *Rhynchelytrum* spp., *Eleusine* spp., *Setaria* spp., *Triumfetta* spp., *Stachytarpheta* spp., *Desmodium* spp., *Gomphrena* spp., *Tephrosia* spp., *Acanthospermum* spp., *Hyptis* spp., *Cenchrus* spp., *Urena* spp., *Vernonia* spp., *Cleome* spp., *Crotalaria* spp., *Kyllinga* spp., *Corchorus* spp., *Ipomoea* spp., *Mitracarpus* spp., *Melanthera* spp., *Centrosema* spp., *Emilia* spp., *Croton* spp., *Phyllanthus* spp., *Passiflora* spp., *Axonopus* spp., *Oldenlandia* spp., *Schwenckia* spp., *Acalypha* spp., *Solenostemon* spp., *Celosia* spp., *Indigofera* spp., *Heterotis* spp., *Acmella* spp., *Leucaena* spp., *Boerhavia* spp., *Spermacoce* spp., *Oplismenus* spp., and *Fimbristylis* spp.

Particularly, the combination of herbicides as defined herein or the composition comprising a combination of herbicides as defined herein are used to control one, several or all harmful plants selected from the group of weed species consisting of *Ageratum* spp., *Calopogonium* spp., *Altemanthera* spp., *Boreiria* spp., *Commelina* spp., *Chromolaena* spp., *Mimosa* spp., *Tridax* spp., *Brachiaria* spp., *Platostoma* spp., *Digitaria* spp., *Synedrella* spp., *Panicum* spp., *Cyperus* spp., *Imperata* spp., *Cynodon* spp., *Pennisetum* spp., *Mariscus* spp., *Euphorbia* spp., *Talinum* spp., *Pteridium* spp., *Melinis* spp., *Sida* spp., *Portulaca* spp., *Rottboellia* spp., *Sorghum* spp., *Ipomea* spp., *Dactyloctenium* spp., *Spigelia* spp., *Boerhaavia* spp., *Desmodium* spp., *Gomphrena* spp., *Tephrosia* spp., *Acanthospermum* spp., *Hyptis* spp., *Cenchrus* spp., *Urena* spp., *Vernonia* spp., and *Cleome* spp.

Specifically, examples may be mentioned of some representatives of the monocotyledonous and dicotyledonous weed flora which can be controlled by the combinations according to the present invention.

More specifically, the combination of herbicides as defined herein or the composition comprising a combination of herbicides as defined herein, may be employed against *Ageratum conyzoides*, *Calopogonium mucunoides*, *Alternanthera sessilis*, *Boreiria ocymoides*, *Commelina erecta*, *Chromolaena odorata*, *Mimosa invisa*, *Commelina benghalensis*, *Tridax procumbens*, *Brachiaria delfexa*, *Platostoma africanum*, *Digitaria adscendens*, *Digitaria horizontalis*, *Synedrella nodiflora*, *Panicum maximum*, *Cyperus rotundus*, *Cyperus esculentus*, *Imperata cylindrica*, *Cynodon dactylon*, *Pennisetum polystachion*, *Pennisetum purpureum*, *Pennisetum violaceum*, *Mariscus alternifolius*, *Euphorbia heterophylla*, *Euphorbia hirta*, *Talinum triangulare*, *Pteridium aquilinum*, *Melinis ninutiflora*, *Sida acuta*, *Sida rhombifolia*, *Commelina diffusa*, *Portulaca oleraceae*, *Rottboellia exaltata*, *Rottboellia cochinchinensis*, *Sorghum halepense*, *Ipomea triloba*, *Dactyloctenium aegyptium*, *Brachiara lata*, *Spigelia anthemia*, *Boerhaavia erecta*, *Aspilia africana*, *Aneilima beniniense*, *Hyparrhenia involucrate*, *Andropogon gayanus*, *Paspalum conjugatum*, *Paspalum orbiculatum*, *Rhynchelytrum repens*, *Eleusine indica*, *Setaria barbata*, *Setaria megaphylla*, *Triumfetta cordifolia*, *Stachytarpheta cayennensis*, *Desmodium scorpiurus*, *Gomphrena celosioides*, *Tephrosia bracteolata*, *Acanthospermum hispidum*, *Hyptis suaveolens*, *Cenchrus biflorus*, *Urena lobata*, *Vernonia ambigua*, *Cleome viscosa*, *Cuscuta australis*, *Corchorus olitorius*, *Mitracarpus villosus*, *Melanthera scandens*, *Centrosema pubescens*, *Emilia coccinea*, *Croton hirtus*, *Phyllanthus amarus*, *Corchorus trilocularis*, *Passiflora foetida*, *Ipomoea involucrate*, *Axonopus compressus*, *Oldenlandia corymbosa*, *Acalypha ciliata*, *Schwenckia americana*, *Solenostemon monostachyus*, *Celosia trigyna*, *Indigofera hirsute*, *Heterotis rotundifolia*, *Acmella brachyglossa*, *Leucaena leucocephala*, *Boerhavia diffusa*, *Spermacoce ocymoides*, *Oplismenus burmannii*, *Fimbristylis littoralis*, *Cyperus iris*, and *Kyllinga erecta*.

Whereas the active compound combination or the composition according to the invention may be used against any unwanted plant, it has shown to be particularly effective against plants selected from the group consisting of *Polygonum convolvulus*, *Solanum nigrum*, *Chenopodium album*, *Amaranthus retroflexus*, *Abuthilon theophrasti*, *Setaria viridis*, *Echinoloa crus-galli*, *Panicum maximum*, *Zea mays* and *Laminum amplexicaule*.

In accordance with the present invention, the active compound combination or the composition according to the invention may be applied as a split application over time. Another possibility is the application of the individual compounds (a) and (b) as defined herein or the active compound combination in a plurality of portions (sequential application), for example after pre-emergence applications, followed by post-emergence applications or after early post-emergence applications, followed by applications at medium or late post-emergence.

Preferred is the simultaneous or nearly simultaneous application of the compounds (a) and (b) as defined herein. In the latter context, a nearly simultaneous application of the compounds (a) and (b) as defined herein means that the compound (a) and the compound (b) are both applied within 24 hours, preferably within 12 hours, more preferably within 6 hours, even more preferably within 3 hours.

In a particularly preferred embodiment, the compounds (a) and (b) as defined herein are used together, i.e. at the same time. Thus, in a particularly preferred embodiment a composition comprising the compounds (a) and (b) as defined herein is used.

The present invention also relates to a process for preparing a composition, characterized in that an active compound combination according to the invention is mixed with at least one auxiliary or that compounds (a) and (b) in the ratios as described elsewhere in this application are mixed with at least one auxiliary.

The present invention also relates to a kit-of-parts comprising compounds (a) and (b) as defined herein, in a synergistically effective amount, in a spatially separated arrangement.

Finally, the present invention relates to the use of the active compound combination according to the invention or the composition according to the invention as a herbicide, preferably against at least *Setaria viridis*, *Echinoloa crus-galli*, *Panicum maximum* and *Zea mays*.

The following Examples illustrate the present invention in a non-limiting fashion.

1. Products Used

The following active compounds were tested:

Product PeAc contained 249.96 g a.i./L of pelargonic acid in an EC formulation

Product IAF contained 200 g a.i./L of indaziflam formulated as SC formulation

Product TBA contained 500 g a.i./L of terbutylazine formulated as SC formulation 2. Biological Trials
Herbicidal Action (Field Trials)

The biological trials were conducted as a field trial with various weed species seeded in rows and grown under natural outdoor conditions. *Abutilon theophrasti, Amaranthus retroflexus, Chenopodium album, Polygonum convolvulus, Setaria viridis, Echinochloa crus-galli, Panicum maximum* as well as the crop *Zea mays* were seeded and applied when the majority reached the BBCH growth stage 16, 16, 16, 22, 22, 22 and 15 respectively after emergence. They were treated with various dosages (as mentioned below) of the compositions according to the invention at a water application rate of 300 L/ha.

The growth stages of the different weed or crop plant species are indicated according to the BBCH monograph "Growth stages of mono- and dicotyledonous plants", 2nd edition, 2001, ed. Uwe Meier, Federal Biological Research Centre for Agriculture and Forestry (Biologische Bundesanstalt für Land und Forstwirtschaft). The respective BBCH stages are mentioned in brackets for the different weed or crop plant species and indicate the BBCH stage for the majority of the respective weed or crop plant species.

After the respective treatment, the herbidical activity was scored visually at 13 or 14 days after application (DAA) by comparing the treated plots with the untreated control plots. Damage and development of all above-ground parts of the plants was recorded. Scoring (rating) was done on a percentage scale (100% action=all plants dead; 50% action=green plant biomass reduced by 50%, and 0% action=no discernible action=like control plot). The Tables reflect the observations after a certain time period, indicated in days (referred to as DAA=days after application) after start of treatment.

The dose rates of herbicidal ingredients used in each case are indicated for the respective active ingredient in brackets and refer to the amount of active ingredient per hectare (g a.i./ha).

3. Calculation

Application of the composition according to the invention often results in effects to weed the sum of which exceeds that of application of the single herbicides comprised in the composition. Alternatively, in some cases a lower application rate for the composition according to the invention is needed in order to achieve a desired effect against weeds as compared to the single compounds.

Such increase in efficacy or decrease in application rate are a strong indication to synergistic action.

The advanced herbicidal activity of the active compound combinations according to the invention is evident from the examples below. The combinations according to the invention have an activity which exceeds a simple addition of activities of the single compounds.

A synergistic effect of herbicides is always present when the herbicidal activity of the active compound combinations exceeds the total of the activities of the active compounds when applied individually. The expected activity for a given combination of two active compounds can be calculated as follows (according to Colby's formula) (cf. Colby, S. R., "Calculating Synergistic and Antagonistic Responses of Herbicide Combinations", Weeds 1967, 15, 20-22):

If
A is the efficacy in % when active compound A is applied at an application rate of a g a.i./ha,
B is the efficacy in % when active compound B is applied at an application rate of b g a.i./ha),
EC is the efficacy in % when the active compounds A and B are applied at application rates of a+b g a.i./ha), respectively, and Then $$EC = A + B - ((X \cdot Y)/100)$$

The degree of efficacy expressed in % is denoted. 0% means an efficacy which corresponds to that of the control while an efficacy of 100% means that no disease is observed.

If the actual herbicidal activity exceeds the calculated value, then the activity of the combination is superadditive, i.e. a synergistic effect exists. In this case, the efficacy which was actually observed must be greater than the value for the expected efficacy (EC) calculated from the abovementioned formula.

A further way of demonstrating a synergistic effect is the method of Tammes (cf. "Isoboles, a graphic representation of synergism in pesticides" in Neth. J. Plant Path., 1964, 70, 73-80).

The invention is illustrated by the following examples. However, the invention is not limited to the examples.

The observed values (EA) of the tests show, at suitable low doses, an effect of the combinations which are higher than the expected values according to Colby (EC).

4. Herbicidal Activity of a Composition Comprising Indaziflam and Pelargonic Acid

TABLE 1

Effect on *Polygonum convolvulus*

| Active compounds | Dose Rate [g a.i./ha] | Herbicidal Activity 13 DAT [%] (EA) | Expected activity (Colby) [%] (EC) | Difference |
|---|---|---|---|---|
| Indaziflam | 10 | 20 | | |
|  | 50 | 55 | | |
| Pelargonic acid | 6000 | 40 | | |
|  | 16000 | 90 | | |
| Indaziflam + Pelargonic acid | 10 + 6000 | 60 | 52 | 8 |
|  | 10 + 16000 | 99 | 92 | 7 |
|  | 50 + 6000 | 80 | 73 | 7 |
|  | 50 + 16000 | 100 | 96 | 5 |

TABLE 2

Effect on *Chenopodium album*

| Active compounds | Dose Rate [g a.i./ha] | Herbicidal Activity 13 DAT [%] (EA) | Expected activity (Colby) [%] (EC) | Difference |
|---|---|---|---|---|
| Indaziflam | 10 | 0 | | |
|  | 50 | 20 | | |
| Pelargonic acid | 6000 | 40 | | |
|  | 16000 | 80 | | |
| Indaziflam + Pelargonic acid | 10 + 6000 | 90 | 40 | 50 |
|  | 10 + 16000 | 100 | 80 | 20 |
|  | 50 + 6000 | 92 | 52 | 40 |
|  | 50 + 16000 | 99 | 84 | 15 |

TABLE 3

Effect on *Abutilon theophrasti*

| Active compounds | Dose Rate [g a.i./ha] | Herbicidal Activity 13 DAT [%] (EA) | Expected activity (Colby) [%] (EC) | Difference |
|---|---|---|---|---|
| Indaziflam | 10 | 60 | | |
| | 50 | 92 | | |
| Pelargonic acid | 6000 | 45 | | |
| | 16000 | 88 | | |
| Indaziflam + Pelargonic acid | 10 + 6000 | 91 | 78 | 13 |
| | 10 + 16000 | 100 | 95 | 5 |
| | 50 + 6000 | 97 | 96 | 1 |
| | 50 + 16000 | 100 | 99 | 1 |

TABLE 4

Effect on *Setaria viridis*

| Active compounds | Dose Rate [g a.i./ha] | Herbicidal Activity 13 DAT [%] (EA) | Expected activity (Colby) [%] (EC) | Difference |
|---|---|---|---|---|
| Indaziflam | 10 | 0 | | |
| | 50 | 0 | | |
| Pelargonic acid | 6000 | 10 | | |
| | 16000 | 45 | | |
| Indaziflam + Pelargonic acid | 10 + 6000 | 45 | 10 | 35 |
| | 10 + 16000 | 65 | 45 | 20 |
| | 50 + 6000 | 65 | 10 | 55 |
| | 50 + 16000 | 78 | 45 | 33 |

TABLE 5

Effect on *Echinocloa crus-galli*

| Active compounds | Dose Rate [g a.i./ha] | Herbicidal Activity 13 DAT [%] (EA) | Expected activity (Colby) [%] (EC) | Difference |
|---|---|---|---|---|
| Indaziflam | 10 | 0 | | |
| | 50 | 0 | | |
| Pelargonic acid | 6000 | 0 | | |
| | 16000 | 25 | | |
| Indaziflam + Pelargonic acid | 10 + 6000 | 45 | 0 | 45 |
| | 10 + 16000 | 78 | 25 | 53 |
| | 50 + 6000 | 75 | 0 | 75 |
| | 50 + 16000 | 95 | 25 | 70 |

TABLE 6

Effect on *Panicum maximum*

| Active compounds | Dose Rate [g a.i./ha] | Herbicidal Activity 13 DAT [%] (EA) | Expected activity (Colby) [%] (EC) | Difference |
|---|---|---|---|---|
| Indaziflam | 10 | 0 | | |
| | 50 | 5 | | |
| Pelargonic acid | 6000 | 20 | | |
| | 16000 | 50 | | |
| Indaziflam + Pelargonic acid | 10 + 6000 | 45 | 20 | 25 |
| | 10 + 16000 | 90 | 50 | 40 |
| | 50 + 6000 | 45 | 24 | 21 |
| | 50 + 16000 | 83 | 53 | 31 |

TABLE 7

Effect on *Zea mays*

| Active compounds | Dose Rate [g a.i./ha] | Herbicidal Activity 13 DAT [%] (EA) | Expected activity (Colby) [%] (EC) | Difference |
|---|---|---|---|---|
| Indaziflam | 10 | 0 | | |
| | 50 | 10 | | |
| Pelargonic acid | 6000 | 38 | | |
| | 16000 | 65 | | |
| Indaziflam + Pelargonic aicd | 10 + 6000 | 53 | 38 | 15 |
| | 10 + 16000 | 93 | 65 | 28 |
| | 50 + 6000 | 60 | 44 | 16 |
| | 50 + 16000 | 92 | 69 | 23 |

5. Herbicidal Activity of a Composition Comprising Terbuthylazine and Pelargonic Acid

TABLE 8

Effect on *Abuthilon theophrasti*; % control compared to untreated, assessed 14 days after application.

| Active compounds | Dose Rate [g a.i./ha] | Herbicidal Activity 14 DAT [%] (EA) | Expected activity (Colby) [%] (EC) | Difference |
|---|---|---|---|---|
| Terbuthylazin | 125 | 0 | | |
| | 250 | 7 | | |
| | 500 | 7 | | |
| | 750 | 20 | | |
| Pelargonic acid | 6000 | 30 | | |
| | 12000 | 57 | | |
| | 16000 | 57 | | |
| Terbuthylazin + Pelargonic acid | 125 + 6000 | 53 | 30 | 23 |
| | 125 + 12000 | 70 | 57 | 13 |
| | 125 + 16000 | 73 | 57 | 16 |
| | 250 + 6000 | 57 | 35 | 22 |
| | 250 + 12000 | 63 | 60 | 3 |
| | 250 + 16000 | 77 | 60 | 17 |
| | 500 + 6000 | 73 | 35 | 38 |
| | 500 + 12000 | 82 | 60 | 22 |
| | 500 + 16000 | 80 | 60 | 20 |
| | 750 + 6000 | 75 | 44 | 31 |
| | 750 + 12000 | 82 | 66 | 16 |
| | 750 + 16000 | 87 | 66 | 21 |

TABLE 9

Effect on *Amaranthus retroflexus*; % control compared to untreated, assessed 14 days after application.

| Active compounds | Dose Rate [g a.i./ha] | Herbicidal Activity 14 DAT [%] (EA) | Expected activity (Colby) [%] (EC) | Difference |
|---|---|---|---|---|
| Terbuthylazin | 125 | 0 | | |
| | 250 | 7 | | |
| | 500 | 47 | | |
| | 750 | 63 | | |
| Pelargonic acid | 6000 | 13 | | |
| | 12000 | 90 | | |
| | 16000 | 93 | | |
| Terbuthylazin + Pelargonic acid | 125 + 6000 | 88 | 13 | 75 |
| | 125 + 12000 | 98 | 90 | 8 |
| | 125 + 16000 | 93 | 93 | 0 |
| | 250 + 6000 | 99 | 19 | 80 |
| | 250 + 12000 | 100 | 91 | 9 |
| | 250 + 16000 | 97 | 93 | 4 |
| | 500 + 6000 | 100 | 54 | 46 |

TABLE 9-continued

Effect on *Amaranthus retroflexus*; % control compared to untreated, assessed 14 days after application.

| Active compounds | Dose Rate [g a.i./ha] | Herbicidal Activity 14 DAT [%] (EA) | Expected activity (Colby) [%] (EC) | Difference |
|---|---|---|---|---|
| | 500 + 12000 | 100 | 95 | 5 |
| | 500 + 16000 | 98 | 96 | 2 |
| | 750 + 6000 | 100 | 68 | 32 |
| | 750 + 12000 | 100 | 96 | 4 |
| | 750 + 16000 | 100 | 97 | 3 |

TABLE 10

Effect on *Chenopodium album*; % control compared to untreated, assessed 14 days after application.

| Active compounds | Dose Rate [g a.i./ha] | Herbicidal Activity 14 DAT [%] (EA) | Expected activity (Colby) [%] (EC) | Difference |
|---|---|---|---|---|
| Terbuthylazin | 125 | 0 | | |
| | 250 | 13 | | |
| | 500 | 67 | | |
| | 750 | 78 | | |
| Pelargonic acid | 6000 | 20 | | |
| | 12000 | 88 | | |
| | 16000 | 97 | | |
| Terbuthylazin + Pelargonic acid | 125 + 6000 | 87 | 20 | 67 |
| | 125 + 12000 | 98 | 88 | 10 |
| | 125 + 16000 | 98 | 97 | 1 |
| | 250 + 6000 | 99 | 30 | 69 |
| | 250 + 12000 | 100 | 90 | 10 |
| | 250 + 16000 | 100 | 97 | 3 |
| | 500 + 6000 | 99 | 74 | 25 |
| | 500 + 12000 | 100 | 96 | 4 |
| | 500 + 16000 | 100 | 99 | 1 |
| | 750 + 6000 | 100 | 82 | 18 |
| | 750 + 12000 | 100 | 97 | 3 |
| | 750 + 16000 | 100 | 99 | 1 |

TABLE 11

Effect on *Echinocloa crus-galli*; % control compared to untreated, assessed 14 days after application.

| Active compounds | Dose Rate [g a.i./ha] | Herbicidal Activity 14 DAT [%] (EA) | Expected activity (Colby) [%] (EC) | Difference |
|---|---|---|---|---|
| Terbuthylazin | 125 | 0 | | |
| | 250 | 0 | | |
| | 500 | 0 | | |
| | 750 | 0 | | |
| Pelargonic acid | 6000 | 13 | | |
| | 12000 | 30 | | |
| | 16000 | 33 | | |
| Terbuthylazin + Pelargonic acid | 125 + 6000 | 28 | 13 | 15 |
| | 125 + 12000 | 30 | 30 | 0 |
| | 125 + 16000 | 32 | 33 | −1 |
| | 250 + 6000 | 30 | 13 | 17 |
| | 250 + 12000 | 30 | 30 | 0 |
| | 250 + 16000 | 30 | 33 | −3 |
| | 500 + 6000 | 30 | 13 | 17 |
| | 500 + 12000 | 33 | 30 | 3 |
| | 500 + 16000 | 37 | 33 | 4 |
| | 750 + 6000 | 27 | 13 | 14 |
| | 750 + 12000 | 33 | 30 | 3 |
| | 750 + 16000 | 38 | 33 | 5 |

The invention claimed is:

1. Active compound combination comprising
   (a) Indaziflam and
   (b) pelargonic acid or a derivative thereof.

2. The active compound composition according to claim 1, further comprising as compound (c) a further agrochemically active agent.

3. A composition comprising the active compound combination according to claim 1 and at least one auxiliary.

4. A method for controlling unwanted plants, characterized in that an active compound combination according to claim 1 is allowed to act or applied on the plants and/or their habitat.

5. A method according to claim 4, wherein the unwanted plant is selected from the group consisting of *Polygonum convolvulus, Solanum nigrum, Chenopodium album, Amaranthus retroflexus, Abuthilon theophrasti, Setaria viridis, Echinoloa crus-galli, Panicum maximum, Zea mays* and *Laminum amplexicaule*.

6. A process for preparing a composition, characterized in that an active compound combination according to claim 1 is mixed with at least one auxiliary.

7. A kit-of-parts comprising,
   (a) Indaziflam and
   (b) pelargonic acid or a derivative thereof,
   wherein compound (a) and compound (b) are present in a weight ratio of between 1:1600 and 1:20, in a synergistically effective amount, and in a spatially separated arrangement.

* * * * *